(12) United States Patent
Ho

(10) Patent No.: US 11,583,087 B2
(45) Date of Patent: Feb. 21, 2023

(54) POSTURE CORRECTION MECHANISM

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 480 days.

(21) Appl. No.: 16/869,790

(22) Filed: May 8, 2020

(65) Prior Publication Data
US 2021/0345778 A1  Nov. 11, 2021

(51) Int. Cl.
*A47C 3/20* (2006.01)
*F16H 25/20* (2006.01)
*A47C 7/54* (2006.01)
*F16H 19/08* (2006.01)

(52) U.S. Cl.
CPC ............... *A47C 3/20* (2013.01); *A47C 7/541* (2018.08); *F16H 19/08* (2013.01); *F16H 25/20* (2013.01); *F16H 2019/085* (2013.01); *F16H 2025/2046* (2013.01); *F16H 2025/2062* (2013.01)

(58) Field of Classification Search
CPC . A63B 23/0233; A63B 21/023; A63B 21/045; A63B 21/4047; A63B 2208/0233; A63B 23/0211
USPC ..................................................... 297/344.12
See application file for complete search history.

(56) References Cited

U.S. PATENT DOCUMENTS

| | | | |
|---|---|---|---|
| 360,279 A * | 3/1887 | Case | A47C 1/0345 297/69 |
| 5,427,337 A * | 6/1995 | Biggs | A61G 15/02 248/405 |
| 6,248,047 B1 | 6/2001 | Abdo | |
| 6,602,171 B1 | 8/2003 | Tsen et al. | |
| 6,746,384 B2 | 6/2004 | Cole et al. | |
| 7,086,992 B2 | 8/2006 | Bowman et al. | |

\* cited by examiner

*Primary Examiner* — Jake Cook
(74) *Attorney, Agent, or Firm* — Browdy and Neimark, PLLC

(57) ABSTRACT

A posture correction mechanism includes a carrier attached to a housing, and a gearwheel rotatably attached to the housing, the gearwheel includes a screw hole engaged with a screw which is moveable up and down relative to the housing for driving the gearwheel to rotate relative to the housing, two shafts are rotatably attached to the carrier and each has an arm rest, two gears are rotatably attached to the carrier and engaged with the gearwheel, the gears are connected to the shafts for allowing the shafts to be driven by the gearwheel to rotate relative to the carrier and for allowing the arm rests to be rotated toward or away from the user.

7 Claims, 5 Drawing Sheets

POSTURE CORRECTION MECHANISM

BACKGROUND OF THE INVENTION

1. Field of the Invention

The present invention relates to a posture correction machine or mechanism, and more particularly to a posture correction machine or mechanism for correcting the sitting posture of the user and for operating to correct postural faults related to abnormal backward curvature of the spine (kyphosis) coupled with abnormal forward curvature of the spine (lordosis).

2. Description of the Prior Art

Typical posture correction machines or devices normally comprise a chair member for supporting the user thereon, and may include various machines or mechanisms or facilities for correcting the sitting posture of the user and for operating to correct postural faults related to abnormal backward curvature of the spine (kyphosis) coupled with abnormal forward curvature of the spine (lordosis), and for exercising or restoring proper spinal alignment or the like.

For example, U.S. Pat. No. 6,248,047 B1 to Abdo, U.S. Pat. No. 6,602,171 B1 to Tsen et al., U.S. Pat. No. 6,746,384 B2 to Cole et al., and U.S. Pat. No. 7,086,992 to Bowman et al. disclose several of the typical posture correction devices each also comprising various machines or mechanisms or facilities for correcting the sitting posture of the user on a seat or chair member and for operating to correct postural faults related to abnormal backward curvature of the spine coupled with abnormal forward curvature of the spine, humpback, half-lying, leaning left and right leaning on the seat or chair member, etc. which may have a huge impact on health.

However, the typical posture correction machines or devices may not be used for correcting the sitting posture of the user while the user is reading or studying on the seat or chair member.

The present invention has arisen to mitigate and/or obviate the afore-described disadvantages of the conventional posture correction machines or devices.

SUMMARY OF THE INVENTION

The primary objective of the present invention is to provide a posture correction machine or mechanism for correcting the sitting posture of the user and for operating to correct postural faults related to abnormal backward curvature of the spine (kyphosis) coupled with abnormal forward curvature of the spine (lordosis).

In accordance with one aspect of the invention, there is provided a posture correction mechanism comprising a housing including a chamber formed in the housing, a carrier attached to the housing, a gearwheel rotatably attached to the housing, the gearwheel including a screw hole formed in the gearwheel, a screw engaged with the screw hole of the gearwheel and moveable up and down relative to the housing for driving the gearwheel to rotate relative to the housing, a seat member engaged on the screw and moved up and down relative to the housing in concert with the screw, a first shaft rotatably attached to the carrier, and a first arm rest disposed on the first shaft and rotated in concert with the first shaft relative to the carrier and the housing, a second shaft rotatably attached to the carrier, and a second arm rest disposed on the second shaft and rotated in concert with the second shaft relative to the carrier and the housing, a first gear rotatably attached to the carrier and engaged with the gearwheel, the first gear being connected to the first shaft for allowing the first gear and the first shaft to be driven by the gearwheel to rotate relative to the carrier and the housing, a second gear rotatably attached to the carrier and connected to the second shaft, and a pinion engaged with the gearwheel and the second gear for allowing the second gear and the second shaft to be rotated and driven relative to the carrier and the housing by the gearwheel and thus for allowing the arm rests to be pivoted or rotated relative to the carrier and the housing to a forward directing position where the user may leave a seat member, and to be pivoted or rotated relative to the carrier and the housing to an inward position where the user may be retained or confined in the seat member.

The housing includes a spring biasing member engaged in the chamber of the housing and contacted and engaged with the screw for biasing and forcing the screw to move upwardly relative to the housing and the gearwheel. The seat member includes a seat back. The housing includes another spring biasing member engaged with the gearwheel for biasing and forcing the gearwheel to move toward the housing.

The first and the second gears are rotatably attached to the carrier with pivot axles respectively. The first and the second gears each include a pulley attached to the pivot axles respectively, and two wheels are attached to the first and the second shafts and connected to the pulleys of the first and the second gears respectively. A supporting base may further be provided, and the housing is disposed on the supporting base.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
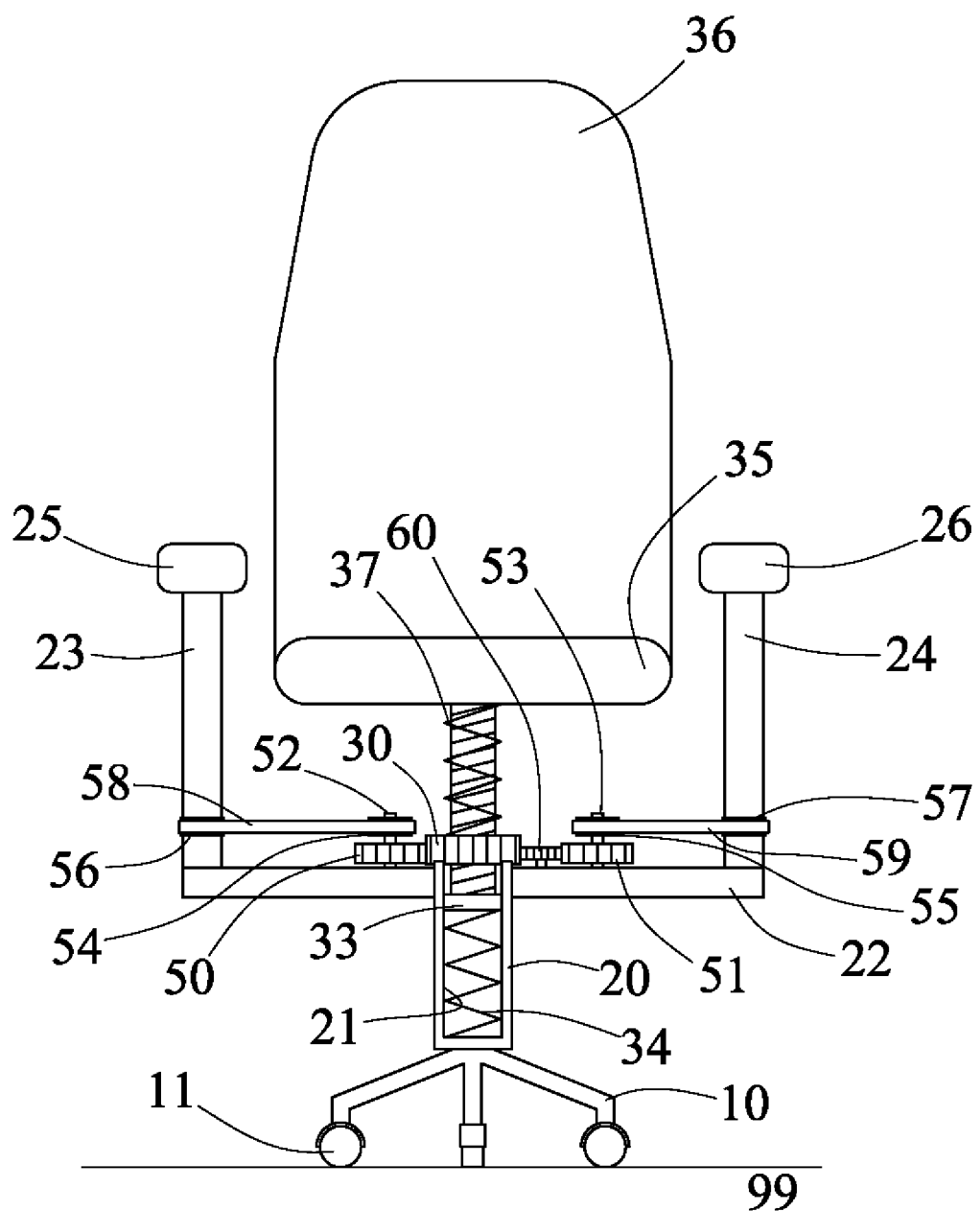
FIG. 1 is a front plan schematic view of a posture correction machine or mechanism in accordance with the present invention.
Figure 2:
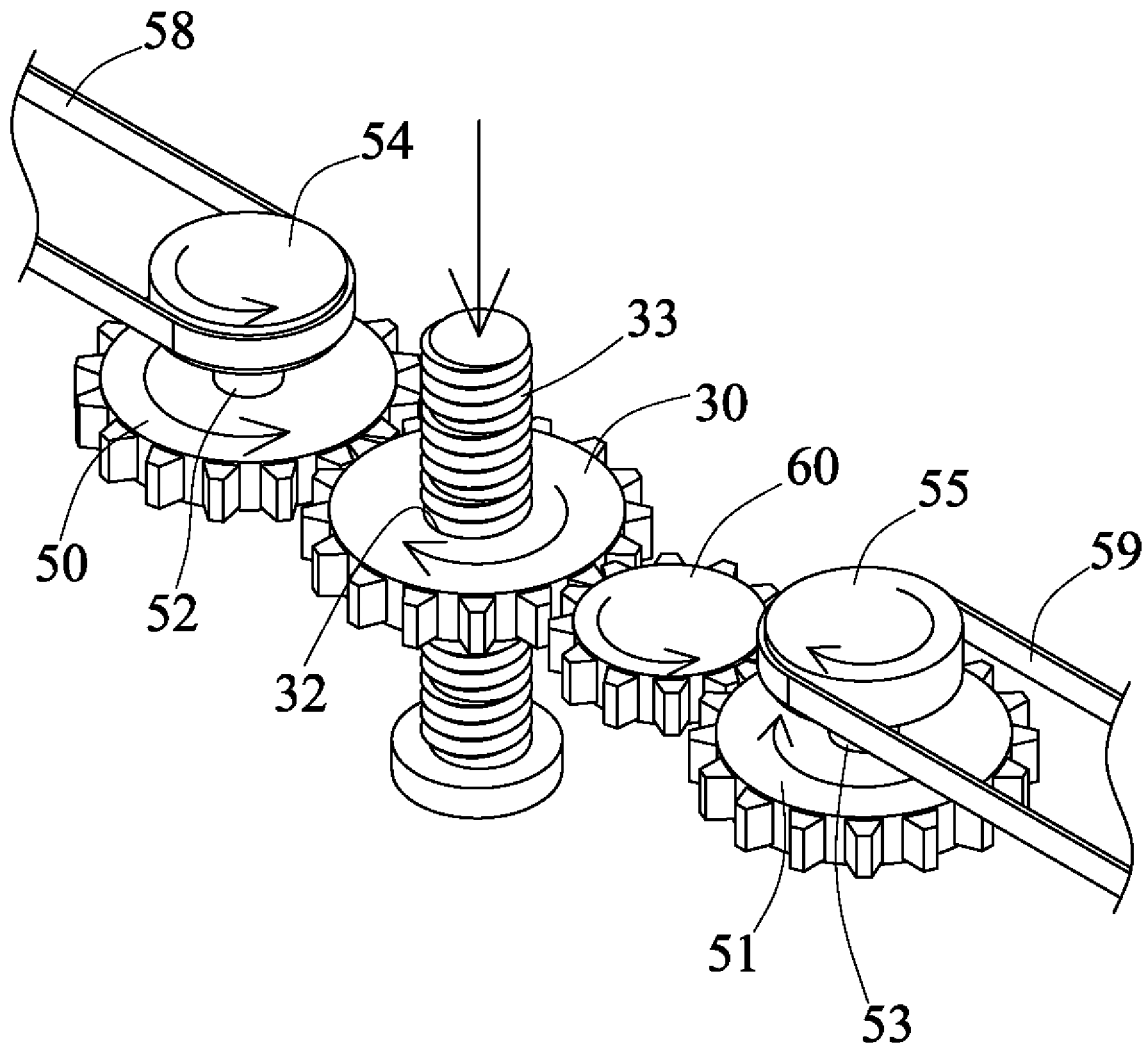
FIG. 2 is a partial perspective view of the posture correction machine or mechanism.
Figure 4:
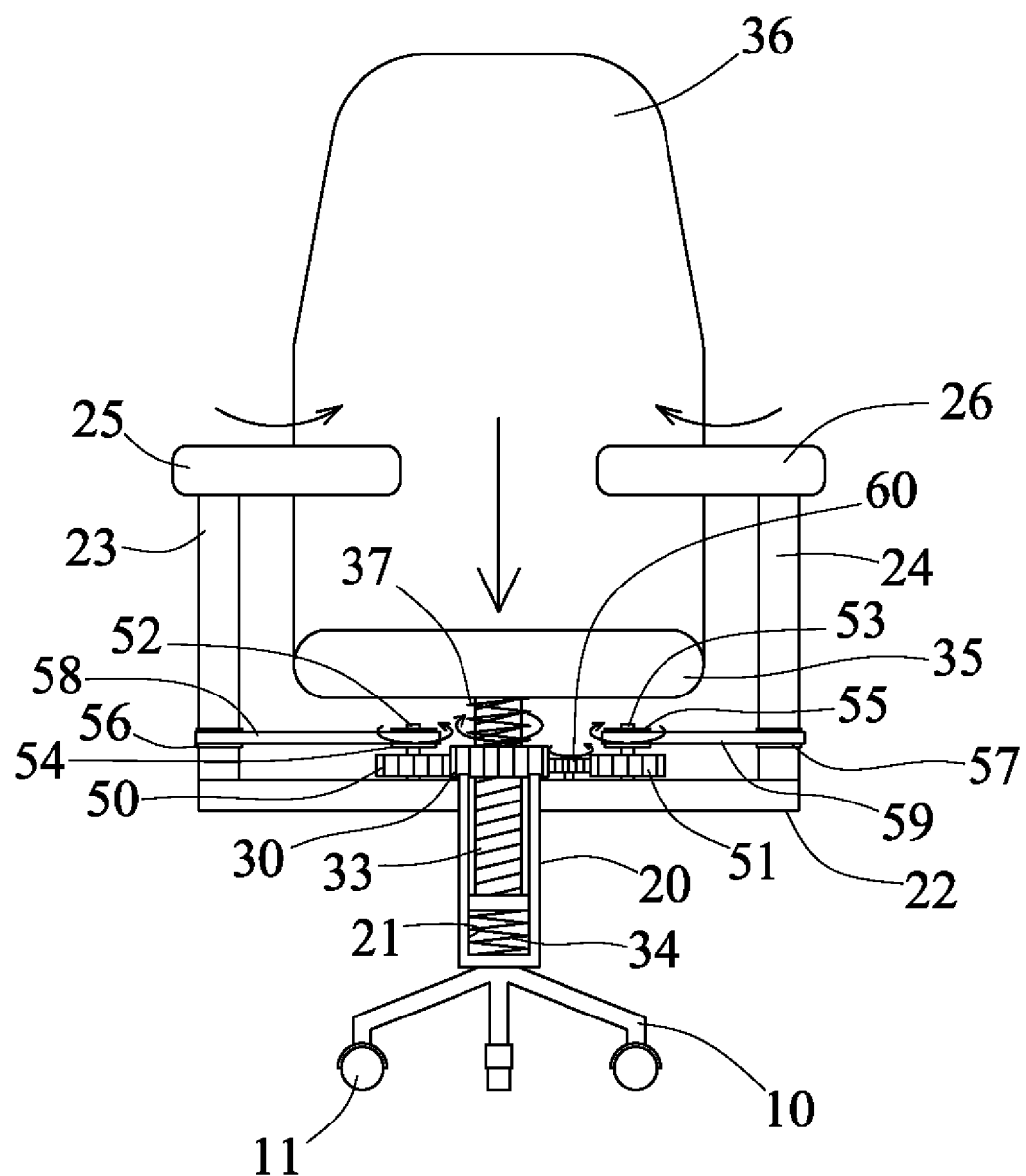
FIGS. 4, 5 are front plan schematic views similar to FIG. 1 illustrating the operation of the posture correction machine or mechanism.
Figure 5:
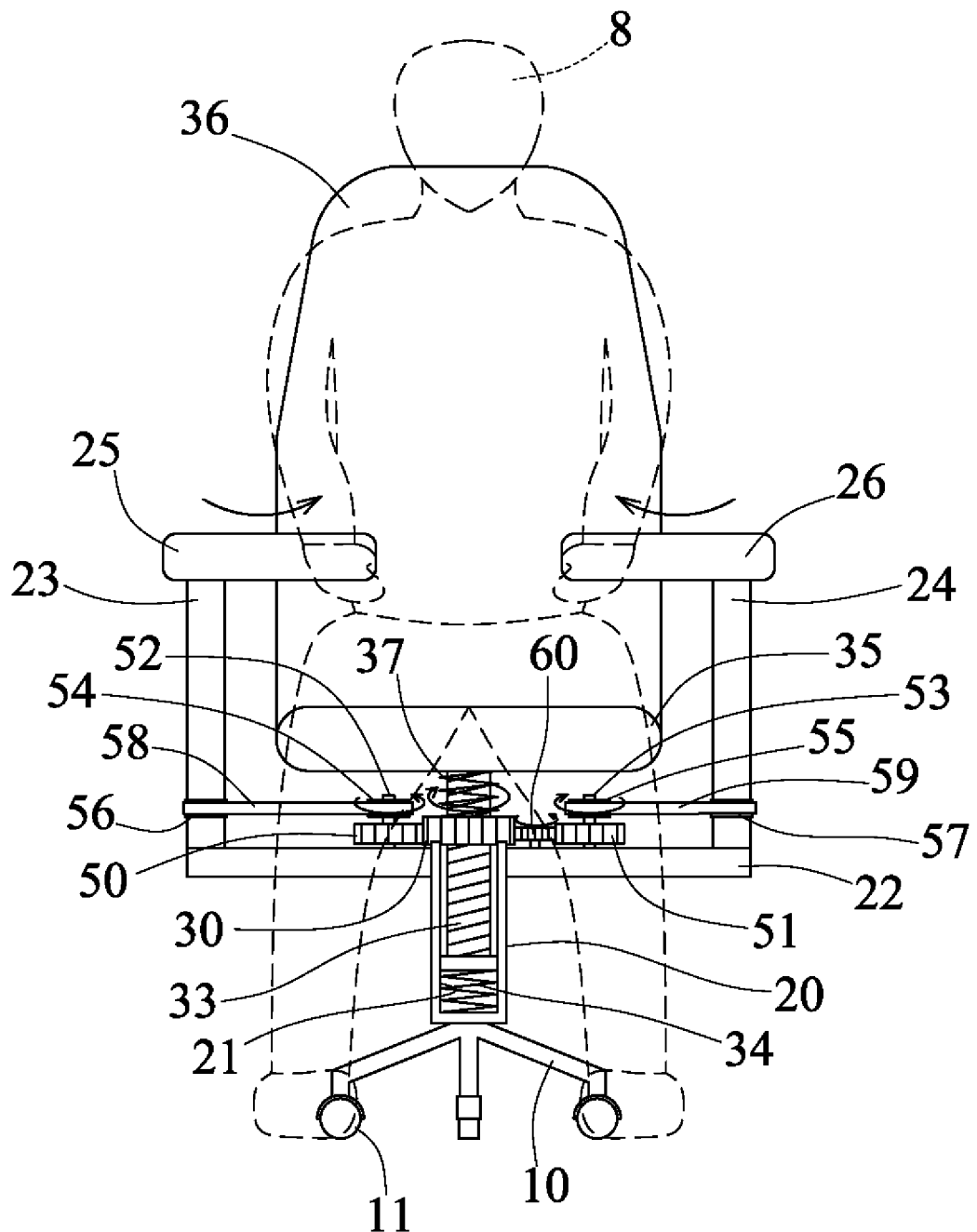

Referring to the drawings, and initially to FIGS. 1 and 4-5, a posture correction machine or mechanism in accordance with the present invention comprises a base member or supporting base 10 including one or more rollers or wheels 11 disposed or attached to the lower or bottom portion thereof for allowing the supporting base 10 to be easily moved elsewhere, and a tubular member or barrel or housing 20 disposed or attached onto the supporting base 10, or extended upwardly from the supporting base 10, and the housing 20 includes a compartment or chamber 21 formed therein, and a plate or panel or carrier 22 is attached or mounted or secured to the housing 20 and preferably parallel to the ground or the supporting surface 99 (FIG. 1).

One or more (such as two) arms or shafts 23, 24 are pivotally or rotatably attached or mounted or secured to or supported on the carrier 22, and each include an arm rest 25, 26 disposed or attached or mounted or secured to or engaged on the first and the second shafts 23, 24 and pivoted or rotated in concert with the shafts 23, 24 respectively, and arranged for allowing the first and the second arm rests 25, 26 to be pivoted or rotated to a forward directing position (FIG. 1) or an inward working position (FIGS. 4, 5) where the arm rests 25, 26 will be disposed or located in front of the user 8 (FIG. 5) for correcting the sitting posture of the user 8 and for preventing the user 8 from humpback or the like, and for operating to correct postural faults.

Figure 3:
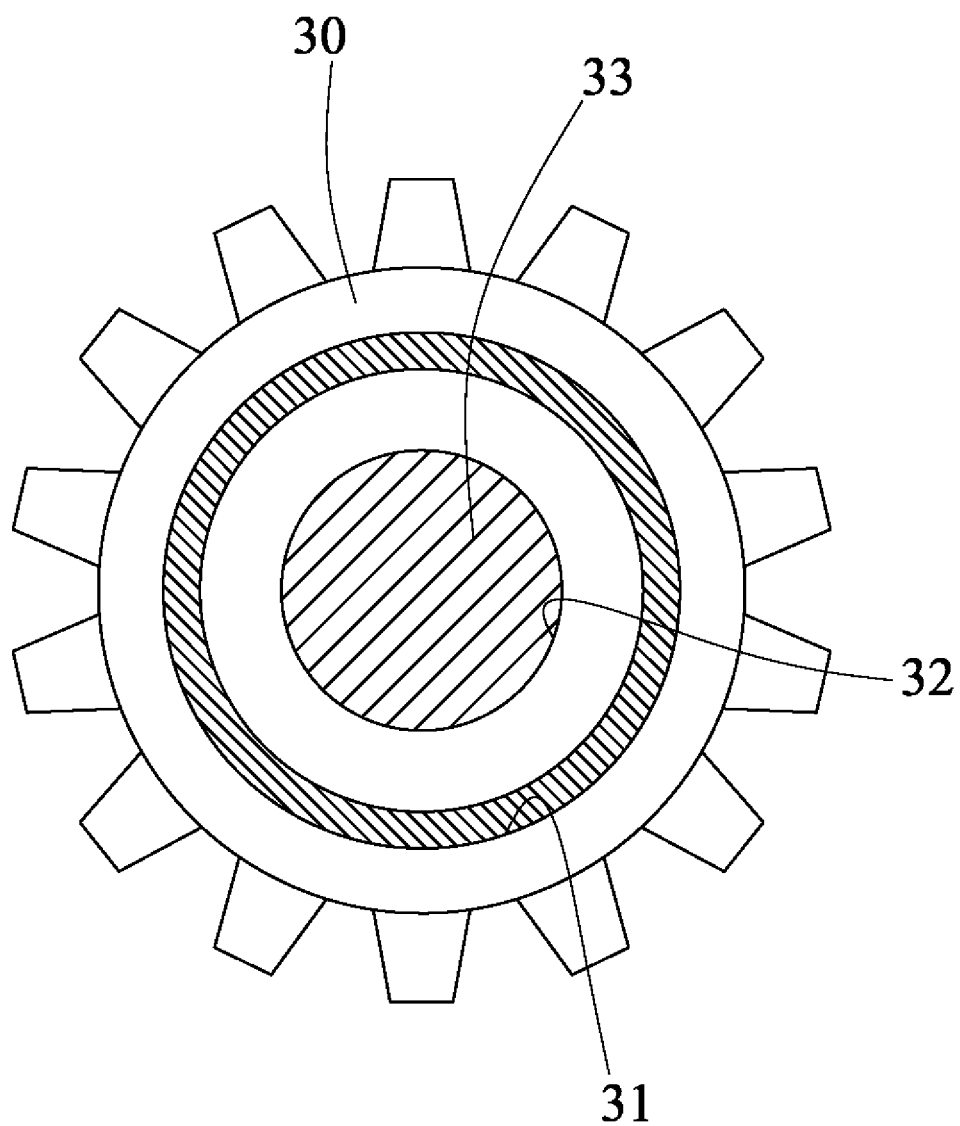
FIG. 3 is a partial cross sectional view of the posture correction machine or mechanism.

A gear or gearwheel 30 is pivotally or rotatably attached or mounted or secured to the housing 20 and disposed or located on top of the housing 20, the gearwheel 30 includes an annular or circular groove 31 formed therein (FIG. 3) for receiving or engaging with the upper portion of the housing 20 and for allowing the gearwheel 30 to be pivotally or rotatably attached to or supported on top of the carrier 22, and the gearwheel 30 is preferably disposed or located on or above the carrier 22. The gearwheel 30 further includes an opening or bore or screw hole 32 formed therein (FIG. 3) for receiving or engaging with a bolt or screw 33, and arranged for allowing the gearwheel 30 to be pivoted or rotated relative to the housing 20 when the screw 33 is moved up and down relative to the housing 20.

For example, as shown in FIGS. 1 and 4-5, the screw 33 is moveable up and down relative to the housing 20 for pivoting or rotating or driving the gearwheel 30 to pivot or rotate relative to the housing 20. A first spring biasing member 34 is disposed or engaged into the chamber 21 of the housing 20 and contacted or engaged with the screw 33 for biasing and forcing or moving the screw 33 upwardly and outwardly of the housing 20 and through the gearwheel 30. A chair or seat member 35 is disposed or attached or mounted or secured to or engaged on the screw 33 and moved up and down relative to the housing 20 in concert with the screw 33, and it is preferable, but not necessary that the seat member 35 includes a seat back 36 formed or provided thereon.

Another or second spring biasing member 37 is further disposed or engaged onto the screw 33 and contacted or engaged with or engaged between the seat member 35 and the gearwheel 30 for biasing and forcing or moving the gearwheel 30 to contact or engage with the housing 20 and for anchoring or retaining or positioning the gearwheel 30 in contact with the housing 20. One or more (such as two) further gearwheels or gears 50, 51 are pivotally or rotatably attached or mounted or secured to the carrier 22 with spindles or pivot axles 52, 53 respectively, and one or more (such as two) rollers or wheels or pulleys 54, 55 are attached or mounted or secured to the pivot axles 52, 53 and pivoted or rotated in concert with the first and the second gears 50, 51 relative to the carrier 22 and the housing 20 respectively.

One or more (such as two) further pulleys or rollers or wheels 56, 57 may further be provided and attached or mounted or secured to the shafts 23, 24 and pivoted or rotated in concert with the shafts 23, 24 respectively, and one or more (such as two) toothed straps or belts 58, 59 are attached or mounted or secured to or engaged with the pulleys 54, 55 and the wheels 56, 57 for allowing the shafts 23, 24 to be connected to and pivoted or rotated or driven relative to the carrier 22 and the housing 20 by the gears 50, 51 respectively. Another gearwheel or gear or pinion 60 may further be provided and meshed or engaged with the gearwheel 30 and one of the gears 51 for allowing the gear 51 and the shaft 24 to be pivoted or rotated or driven relative to the carrier 22 and the housing 20 by the gearwheel 30. The other gear 50 is directly meshed or engaged with the gearwheel 30 for allowing the other gear 50 and the other shaft 23 to be pivoted or rotated or driven relative to the carrier 22 and the housing 20 by the gearwheel 30 directly.

In operation, as shown in FIGS. 4 and 5, when the seat member 35 and thus the screw 33 are depressed and forced to move downwardly relative to the carrier 22 and the housing 20 by the user 8, the gearwheel 30 may be driven by the screw 33 to pivot or rotate relative to the carrier 22 and the housing 20, and the gears 50, 51 may then be driven by the gearwheel 30 directly or indirectly with the pinion 60, and thus the shafts 23, 24 and the arm rests 25, 26 may be driven by the gears 50, 51 to be pivoted or rotated relative to the carrier 22 and the housing 20 to the inward working position (FIGS. 4, 5) where the arm rests 25, 26 are disposed or located in front of the user 8 (FIG. 5) for correcting the sitting posture of the user 8 and for preventing the user 8 from humpback or the like, and for operating to correct postural faults.

As shown in FIG. 1, when the seat member 35 and thus the screw 33 are released, either or both of the spring biasing members 34, 37 may bias and force the screw 33 to move upwardly relative to the carrier 22 and the housing 20 and the gearwheel 30 for allowing the gears 50, 51 and the shafts 23, 24 and the arm rests 25, 26 to be pivoted or rotated relative to the carrier 22 and the housing 20 by the gearwheel 30, and thus for allowing the arm rests 25, 26 to be pivoted or rotated relative to the carrier 22 and the housing 20 to the forward directing position (FIG. 1) and thus for allowing the user 8 to leave the seat member 35.

Accordingly, the posture correction machine or mechanism in accordance with the present invention may be provided for correcting the sitting posture of the user and for operating to correct postural faults related to abnormal backward curvature of the spine (kyphosis) coupled with abnormal forward curvature of the spine (lordosis).

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A posture correction mechanism comprising:
   a housing including a chamber formed in said housing,
   a carrier attached to said housing,
   a gearwheel rotatably attached to said housing, said gearwheel including a screw hole formed in said gearwheel,
   a screw engaged with said screw hole of said gearwheel and moveable up and down relative to said housing for driving said gearwheel to rotate relative to said housing,
   a seat member engaged on said screw and moved up and down relative to said housing in concert with said screw,
   a first shaft rotatably attached to said carrier, and a first arm rest disposed on said first shaft and rotated in concert with said first shaft relative to said carrier and said housing,
   a second shaft rotatably attached to said carrier, and a second arm rest disposed on said second shaft and rotated in concert with said second shaft relative to said carrier and said housing, a first gear rotatably attached to said carrier and engaged with said gearwheel, said first gear being connected to said first shaft for allowing said first gear and said first shaft to be driven by said gearwheel to rotate relative to said carrier and said housing, a second gear rotatably attached to said carrier and connected to said second shaft, and a pinion engaged with said gearwheel and said second gear for allowing said second gear and said second shaft to be rotated and driven relative to said carrier and said housing by said gearwheel.

2. The posture correction mechanism as claimed in claim 1, wherein said housing includes a spring biasing member engaged in said chamber of said housing and contacted and engaged with said screw for biasing and forcing said screw to move upwardly relative to said housing and said gearwheel.

3. The posture correction mechanism as claimed in claim 1, wherein said seat member includes a seat back.

4. The posture correction mechanism as claimed in claim 1, wherein said housing includes a second spring biasing member engaged with said gearwheel for biasing and forcing said gearwheel to move toward said housing.

5. The posture correction mechanism as claimed in claim 1, wherein said first and said second gears are rotatably attached to said carrier with pivot axles respectively.

6. The posture correction mechanism as claimed in claim 5, wherein said first and said second gears each include a pulley attached to said pivot axles respectively, and two wheels are attached to said first and said second shafts and connected to said pulleys of said first and said second gears respectively.

7. The posture correction mechanism as claimed in claim 1 further comprising a supporting base, and said housing being disposed on said supporting base.

* * * * *